Sept. 18, 1962

L. M. WILEY, JR 3,054,209

FISHING LURE

Filed Jan. 27, 1961

INVENTOR.
LEE M. WILEY, JR.
BY
Lockwood, Woodard, Smith & Weikart
Attorneys

United States Patent Office 3,054,209
Patented Sept. 18, 1962

3,054,209
FISHING LURE
Lee M. Wiley, Jr., 615 Whites Ave., Marion, Ind.
Filed Jan. 27, 1961, Ser. No. 85,429
2 Claims. (Cl. 43—42.02)

The present invention relates generally to fishing lures and in particular to a lure adapted for use in sport fishing wherein the lure is moved through the water by means of intermittent impulses or jerks provided by the fisherman.

The novelty of the present invention resides primarily in the ability of the lure to elongate and then return to its original length, that is, to undulate in its direction of movement through the water. In its preferred form the structure includes an elongated, resilient member which is provided with a helical configuration, the resilient member taking the form of a flat strip of highly polished, light reflective metal which, in addition to its helical configuration is twisted axially. The axial twisting of the member provides substantially radial strength without stiffening the member longitudinally. The axial twisting further provides a varied, random light reflectivity producing a "sparkling" effect as the lure is moved through the water.

The primary object of the present invention is to provide a lure which will undulate longitudinally as it is moved through the water by intermittent jerks on the line to which the lure is attached.

A further object of the present invention is to provide a lure of the type referred to having high, random light reflectivity as it is moved through the water.

The full nature of the invention will be understood from the accompanying drawings and the following description and the claims.

Figure 1:
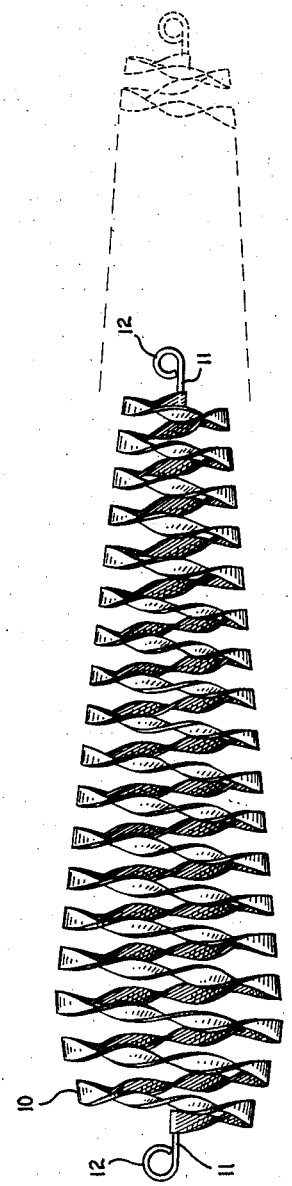
FIG. 1 is a side view of a lure embodying the present invention, the variation in length of the lure under longitudinal stress being indicated by broken lines.

Referring to the drawings, the structure of the present invention includes a resilient strip 10 which is preferably formed of metal having a high light reflective surface. The strip 10 is provided with a helical configuration having a predetermined length when unstressed longitudinally. At each end of the helix, the ends 11 of the strip are shaped so as to extend axially and provide loops 12 to which fishing hook assemblies, leader-swivels and the like, may be attached.

It will be evident from the drawings that the strip 10, in addition to its helical configuration is also twisted axially. As indicated by broken lines in FIG. 1, when subjected to tension or compression, the lure will change its overall length and the axial twisting of the strip provides substantial radial stiffening without stiffening the lure longitudinally.

Figure 2:
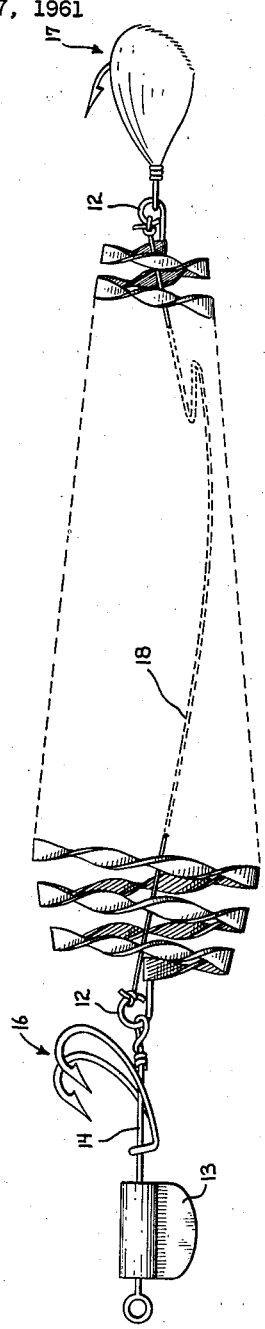
FIG. 2 is a side view of the lure of FIG. 1 but showing in addition one manner of fastening fishing hooks to the lure.

While various hook assemblies, leaders and the like, may be attached to the lure in any suitable fashion, one satisfactory arrangement is shown in FIG. 2. A keel shaped weight 13 may be attached to a suitably formed wire or spindle 14 which may also carry the double hook 16. The inner end of the spindle 14 may be attached to the loop 12 at the head end of the lure and feathered hook 17 may be attached to the trailing loop 12. A flexible cable or line 18 may be attached to the ends of the lure at, for example, the loops 12 and extends centrally through he convolutions of the helix. The cable 18 has a length sufficient to permit sizable longitudinal undulations of the lure but prevents the lure from being stressed beyond its elastic limit.

The operation of the lure will be obvious from the foregoing. When the lure is pulled through the water, the helical configuration permits the lure to alter its length or undulate longitudinally as the line is drawn in by jerks or pulses. The axial twisting of the strip provides radial stiffening as previously mentioned but further provides relatively high, random light reflectivity as the lure is moved through the water.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

What is claimed is:

1. A fishing lure adapted to be pulled through water, said lure including a resilient metal strip of high light reflectivity having parallel side edges and a longitudinal axis, said strip being twisted along its longitudinal axis and formed into a helix whereby high random light reflectivity is obtained as the lure is moved through the water and intermittent changes in the force pulling the lure through the water produce a longitudinal undulation thereof, and said lure having fish hook attaching means thereon.

2. A fishing lure adapted to be pulled through water including a resilient strip of high light reflectivity having parallel side edges and a longitudinal axis, said strip being twisted along its longitudinal axis and formed into a helix whereby high random light reflectivity is obtained as the lure is moved through the water and intermittent changes in the force pulling the lure through the water produce a longitudinal undulation thereof.

References Cited in the file of this patent

UNITED STATES PATENTS

| 1,967,089 | Hick | July 17, 1934 |
| 2,493,431 | Wold | Jan. 3, 1950 |
| 2,932,112 | Graves | Apr. 12, 1960 |